United States Patent [19]

Reed

[11] Patent Number: 4,827,655

[45] Date of Patent: May 9, 1989

[54] ILLUMINABLE FISHING FLOAT

[76] Inventor: Gerald D. Reed, 14501 Berkshire Dr., Independence, Mo. 64055

[21] Appl. No.: 172,790

[22] Filed: Mar. 28, 1988

[51] Int. Cl.$^4$ .............................................. A01K 85/01
[52] U.S. Cl. ...................................... 43/17.5; 43/44.95
[58] Field of Search ..................... 43/17.5, 44.87, 44.95

[56] References Cited

U.S. PATENT DOCUMENTS

| | | | |
|---|---|---|---|
| 2,236,215 | 3/1941 | Klinitski | 43/17.5 |
| 3,559,224 | 2/1971 | Shimizu | 43/17.5 |
| 4,291,484 | 9/1981 | Young | 43/17.5 |
| 4,437,256 | 3/1984 | Kulak | 43/17.5 |
| 4,506,471 | 3/1985 | Riead | 43/44.95 |
| 4,516,349 | 5/1985 | Klocksiem | 43/17.5 |

Primary Examiner—Gene P. Crosby
Attorney, Agent, or Firm—Kokjer, Kircher, Bradley, Wharton, Bowman & Johnson

[57] ABSTRACT

A fishing bobber having means for illuminating portions thereof for increased visibility in adverse lighting conditions. An elongated member projects outwardly from a body portion of the bobber and is illuminated by a light emitting diode (LED) housed within the bobber. A series of annular rings and a beveled end portion of the member are illuminated by the LED. Irregularities formed within the member also provide areas of enhanced illumination. The bobber is generally elongated with a tapering cross-section which reduces the resistance felt by the fish when initially striking the bait.

19 Claims, 1 Drawing Sheet

ILLUMINABLE FISHING FLOAT

BACKGROUND OF THE INVENTION

This invention relates in general to fishing floats or bobbers and more particularly to a bobber which may be illuminated for grearter visibility, especially in poor lighting conditions.

While fishing, it is important that a fisherman be able to spot when a fish first takes the bait so that the hook may be properly set before the bait is released by the fish. Conventional fishing bobbers provide a visual indication of when the fish grabs the bait so that the fisherman may react to set the hook. While these bobbers may prove adequate for this purpose during the portions of the day when lighting conditions allow the fisherman to view the bobber, they are less than desirable under poor lighting conditions such as at night and early in the morning when the bobber is less visible. Under these conditions, a fisherman may be unable to properly set the hook and may lose fish that he might otherwise have been able to catch if he were able to visually determine when a fish has initially taken the bait.

SUMMARY OF THE INVENTION

It is an object of this invention to provide a fishing bobber which is readily visible in poor lighting conditions so that the fisherman may easily determine when a fish has been hooked.

It is another object of this invention to provide a fishing bobber which may be illuminated for fishing in poor lighting conditions and which is constructed in a manner which allows for easy operation of the illumination mechanism.

It is a further object of this invention to provide a fishing bobber which may be illuminated and which assumes a vertical profile for greater visibility when sufficient downward foce is supplied by the fishing line.

It is a still further object of this invention to provide a fishing bobber with an illumination device which is easy to assemble and which is also of a durable construction to withstand the adverse conditions with which it is used.

It is also an object of this invention to provide a fishing bobber constructed in a manner such that its buoyant characteristics reduce the resistance that a fish senses as it takes the bait so that the fish will be less likely to release the bait to the fisherman setting the hook.

It is yet another object of this invention to provide a fishing bobber which is constructed in a manner such that its buoyant characteristics allow a portion of the bobber to remain visible until the fish has sufficiently engaged the bait so that the fisherman may determine the appropriate time for setting the hook.

To accomplish these and other related objects of the invention, a bobber is provided with an illuminable elongated member which extends outwardly from a body portion of the bobber. A light emitting diode (LED) or other illuminating means is mounted within the body portion of the bobber for illuminating the member. Activation of the LED is regulated by a switch which is coupled with the body portion of the bobber. A line clamp is also coupled with the body portion of the bobber. The elongated member is fabricated from material which will conduct the light waves generated by the LED and may include annular ring portions and a beveled end portion for refracting the light waves to provide regions of increased illumination. The body portion may be fabricated from transparent material so that portions of the elongated member housed within the body portion are visible.

BRIEF DESCRIPTION OF THE DRAWINGS

In the accompanying drawings in which like reference numerals are use to indicate like parts in the various views.

DESCRIPTION OF THE PREFERRED EMBODIMENT

Figure 1:
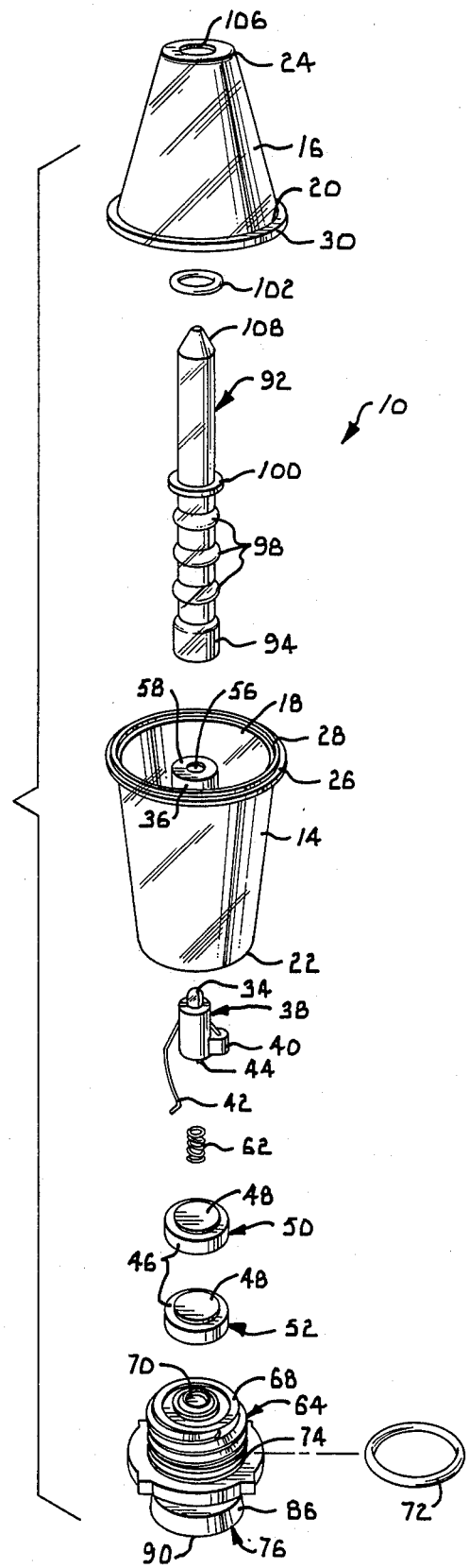
FIG. 1 is an exploded perspective view of a fishing bobber of the present invention.
Figure 2:
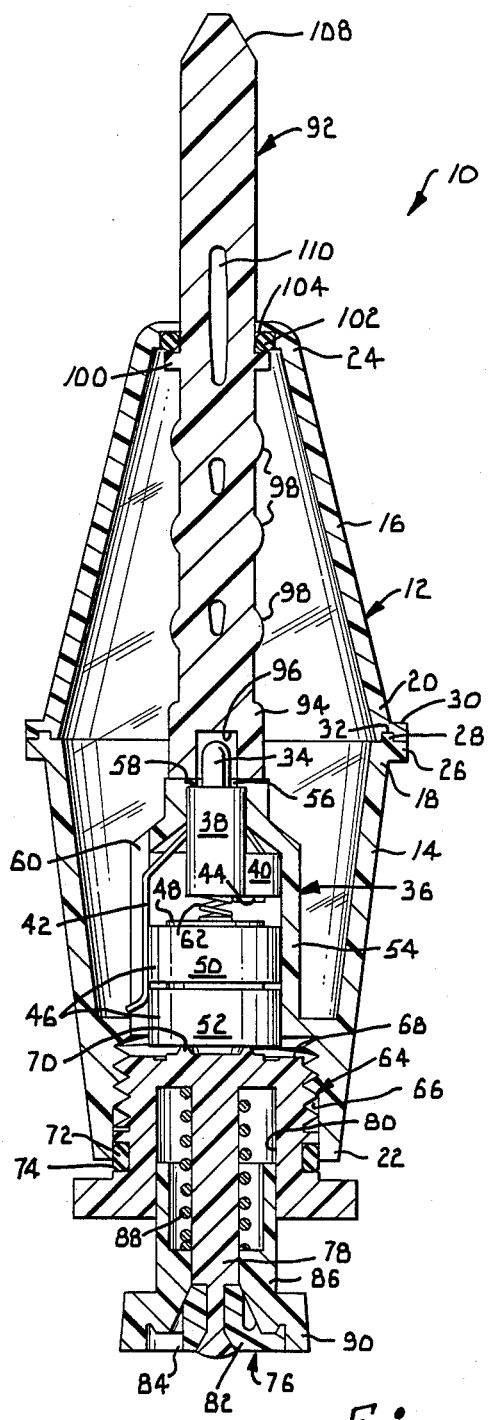
FIG. 2 is a side elevational view of the fishing bobber shown in FIG. 1, taken in vertical section.

Referring now more particularly to the drawings, a fishing bobber of the present invention is represented generally by the numeral 10. Bobber 10 comprises a hollow body portion 12 formed from a pair of frusto-conically shaped sections 14 and 16 which are joined together at their larger ends 18 and 20. The smaller ends 22 and 24 of the sections form the ends of the body portion so that the cross-sectional dimension of the body portion increases as its central portion is approached from each end.

To insure a water-tight seal at the juncture of sections 14 and 16, a flange 26 having an annular rib 28 is formed at the end of section 14. A similar flange 30 is formed at the end 20 of section 16 and includes a groove 32 of a size and shape for receiving rib 28. Joinder of rib 28 with groove 32 prevents relative lateral displacement of sections 14 and 16. Glue or other suitable means may be used to prevent axial detachment of the sections.

A light emitting diode (LED) 34 for illuminating portions of the bobber 10 is coupled with a support structure 36 positioned within the internal chamber of section 14. LED 34 is mounted with a generally cylindrical fixture 38 which includes a stabilizing arm 40 at a bottom end thereof. A pair of conducting wires 42 and 44 are coupled with LED 34 and respectively contact the electrode surfaces 46 and 48 of batteries 50 and 52 which provide the power source for illumination of the LED.

The support structure 36 which houses the LED 34 and batteries 50 and 52 comprises a generally cylindrical wall portion 4 which is coupled at its bottom end with section 14. The bottom end of structure 36 is open ended and is sized for allowing insertion of batteries 50 and 52. The upper end of the structure tapers to a smaller diameter than the lower end and includes an opening 56 having a diameter slightly larger than LED 34. The inner diameter of wall portion 54 at the top end is sized for tightly engaging fixture 38. An inwardly projecting flange 58 prevents upward axial movement of fixture 38 while stabilizing arm 40 reduces lateral movement of the fixture.

A vertical slot 60 is formed in wall portion 54 to receive wire conductor 42 which extends downwardly from fixture 38 to contact battery electrodes 46. Wire conductor 44 extends through stabilizing arm 40 and is bent to rest against the bottom surface of fixture 38. A biasing spring 62 extends downwardly from the fixture and engages battery electrode 48.

Activation of the LED 34 is regulated by a control mechanism in the form of an externally threaded plug 64. Plug 64 is coupled with an internally threaded well 66 formed at section end 22. The top surface 68 of the plug includes a projecting circular ring 70 for contacting the bottom surface of battery 52. A rubber O-ring 72 is fitted in a retaining groove 74 adjacent the threaded portion of the plug for providing a water-tight seal between the plug and the inner wall of well 66.

A clamp 76 for attaching a fishing line is coupled with plug 64 and comprises an integrally form stem 78 projecting outwardly through a bore 80 formed in a portion of the plug. A head 82 is coupled with the terminal portion of stem 78 and includes a series of grooves 84. A plunger 86 surrounds stem 78 and is sized for sliding axial movement within bore 80 and along the stem. A spring 88 is coiled around stem 78 and engages the plunger to bias it to an outward position. The terminal portion 90 of the plunger is enlarged to envelop head 82 when in the outward position. Further details of the clamp may be obtained by reference to U.S. Pat. No. 4,506,471, entitled "Line Attachment for Fishing Float", which is incorporated herein by reference.

The bobber 10 is also provided with an elongated illuminable member 92 which extends axially through section 16 and outwardly through section end 24. Member 92 is generally cylindrical in shape and includes a slightly enlarged end portion 94 having a central bore 96. End portion 94 abutts the support structure 36 such that LED 34 extends partially within bore 96. A series of annular ribs 98, whose function will be described hereafter, are formed on the portion of member 92 housed with bobber section 16. A shoulder 100 is also formed on member 92 for engaging a rubber O-ring 102 housed within an interior recessed portion 104 of section end 24 to provide a water-tight seal. Member 92 extends through an opening 106 at section end 24 and has a beveled terminal portion 108.

Member 92 is preferably formed from a plastic transparent medium having a refractive index which will act as a conduit for the light waves generated by LED 34. During manufacture of the member, air bubbles 110 may form within the member. The bobber sections 14 and 16 may also be formed from transparent materials such as a polycarbonate plastic so that the portion of member 92 which is housed within the body portion may be visible.

In use, the LED 34 may be illuminated by turning plug 64 to bring battery electrode 48 into contact with wire conductor 44 to close the electrical circuit. The light waves emanating from LED 34 are then conducted along the elongated member 92 as the air surrounding the member has a lower refractive index than the plastic or other material comprising the member. Placement of the LED within the bore 96 formed at the end 94 of member 92 increases the amount of light conducted along the member.

As the light waves travel along the member, the annular rings 98 serve the important function of refracting a portion of the light waves so that light passes outwardly through and illuminates the rings. This concentrates the light emitted at the rings so that visibility of the rings is increased. A similar purpose is also served by the beveled terminal portion 108 of the member which concentrates light at the tip of the bobber. It has been found that a bobber constructed as disclosed herein can be visible at a distance of up to 200 feet under adverse lighting conditions.

The illuminated rings 98 and beveled terminal portion 108 also provide a recognizable visual pattern of concentrated light so that the bobber may be detected even in poor lighting conditions. This recognizable pattern is particularly desirable in conditions where extraneous light sources are reflected by the water and would otherwise make it difficult to identify the bobber. The air bubbles 110 formed during the manufacture of the elongated member also refract the light and provide areas of enhanced illumination along the member to provide a characteristic light pattern for each bobber. Various substances may be substituted for the air bubbles to form the irregularities within the member which provide this beneficial result.

Illumination of the tip of the bobber in cooperation with the series of rings 98 also provides a visual gauge which allows the fisherman to determine the depth to which the bobber has been taken by the fish. This allows the fisherman to visually determine when the hook should be set.

When illumination of the bobber is no longer required, the LED 34 may be switched off by simply rotating the plug 64 to allow axial movement of batteries 50 and 52 so that battery electrode 48 is no longer in contact with wire conductor 44. Compression spring 62 supplies the required biasing force to maintain an open electrical circuit by maintaining the batteries in contact with plug 64. The use of the rotatable plug provides a reliable switching mechanism which is unlikely to be inadvertently switched on when carried in a tackle box.

The buoyant characteristics of the bobber are also particularly advantageous. The bobber will assume an upright position when sufficient weight is applied to the portion of the fishing line between the bobber and the hook. When in the upright positon, the generally elongated shape of the bobber provides sufficient buoyancy to maintain the bobber afloat while providing a greater vertical profile for increased visibility. The larger cross-sectional area of the central portion of the body portion provides the needed buoyancy while the gradually tapering cross-section of the bobber reduces the resistance felt by a fish when it first strikes the bait, thus descreasing the likelihood that the fish will release the bait before the fisherman has an opportunity to set the hook.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A fishing float comprising:
   a buoyant body portion;
   a member extending form said body portion;
   means coupled with said float and operable to illuminate at least a portion of said member,
   said member being elongated and comprising a material having a refractive index selected such that light waves generated by said illumination means may be conducted through said member, said elongated member including one or more annular rings for providing regions of enhanced illumination with at least one of said rings being positioned within said body portion, at least a portion of said body portion being transparent so that said one ring is exteriorly visible; and clamp means coupled with said body portion for releaseably coupling said float to a fishing line.

2. The invention of claim 1, including a switch coupled with said illumination means for controlling operation thereof.

3. The invention of claim 1, wherein said body portion is elongated and has opposed ends and a center region and wherein the cross-sectional dimension of said body portion increases as the center region is approached from each end.

4. The invention of claim 1, wherein said elongated member (means comprises) includes a beveled end portion for providing enhanced illumination of said end portion.

5. The invention of claim 1, wherein said elongated member includes irregularities formed within the elongated member for providing regions of enhanced illumination.

6. The invention of claim 1, wherein said illumination means comprises a light emitting diode mounted within said body portion and a battery which may be operably coupled with said light emitting diode.

7. The invention of claim 6, wherein a switch includes a plug threadably coupled with said body portion, said plug being positioned for moving said battery and light emitting diode into operable engagement by rotation of said plug.

8. The invention of claim 1, wherein said clamp means comprises a plug coupled with one end of said float body portion and wherein the elongated member extends from the other end of the body portion, whereby said elongated member extends vertically upward from said body portion when said float is placed in water and dusfficient downward force is applied to said clamp.

9. A fishing float comprising:
an elongated buoyant body portion having opposed ends and a center portion;
an elongated member coupled with said body portion and extending from one of said ends;
means coupled with said float and operable to illuminate at least a portion of said elongated member,
said elongated member comprising a material having a refractive index selected such that light waves generated by said illumination means may be conducted through said member,
said elongate member including annular rings for refracting said light waves to provide enhanced illumination at said rings,
at least one of said rings being positioned within said body portion and at least a portion of said body portion being transparent so that said ring is exteriorly visible;
clamp means coupled with the other of said body portion ends for attaching said float to a fishing line; and
a switch mounted in operable engagement with said illumination means.

10. The invention of claim 9, wherein said elongated member includes a beveled end portion for enhancing the illumination of said end portion.

11. The invention of claim 9, wherein said illumination means comprises a light emitting diode mounted within said body portion and a battery which may be operably coupled with said light emitting diode.

12. The invention of claim 11, wherein said switch includes a plug threadably coupled with said body portion, said plug being positioned for moving said battery and light emitting diode into operable engagement by rotation of said plug.

13. The invention of claim 9, wherein the cross-sectional dimension of said body portion increases as the center portion is approached from each end.

14. A fishing float comprising:
an elongated, buoyant body portion having a first end, an opposed second end and a center portion;
an elongated member coupled with said body portion and extending from said first end;
means coupled with said float and operable to illuminate at least a portion of said elongated member,
said elongated member comprising a material having a reference index selected such that light waves generated by said illumination means may be conducted through said member;
a switch mounted in operable engagement with said illumination means; and
clamp means coupled with the second end of said body portion for attaching said float to a fishing line,
said elongated, buoyant body portion being adapted such that a longitudinal axis extending through said body portion and said elongated member extends generally horizontally when said fishing float is placed in a body of water,
wherein said fishing float pivots to place said longitudinal axis in a generally vertical orientation with said elongated member extended above the surface of the water when a sufficient vertically downward force is applied to said second end by said fishing line when the clamp means is coupled therewith.

15. The invention of claim 14, including annular rings positioned on said elongated member for refracting said light waves passing through said elongated member to provide enhanced illumination at said rings.

16. The invention of claim 15, wherein at least one of said rings is positioned within said body portion and at least a portion of said body portion is transparent so that said ring is exteriorly visible.

17. The invention of claim 15, wherein said elongated member includes a beveled end portion for enhancing illumination of said end portion.

18. The invention of claim 14, wherein said switch includes a plug threadably coupled with said body portion, said plug being positioned for moving said battery and light emitting diode into operable engagement by rotation of said plug.

19. The invention of claim 14, wherein said body portion comprises a pair of frusto-conical sections, each having a large cross-sectional end and a small cross-sectional end, the large cross-sectional ends of each section being joined together so that the cross-sectional dimension of the body portion increases as the center portion is approached from the first and second ends.

* * * * *